Patented July 2, 1940

2,206,850

UNITED STATES PATENT OFFICE 2,206,850

TREATING SHEETS OR STRIPS OF CASEIN PLASTICS

John A. Parsons, Bainbridge, N. Y., assignor to American Plastics Corporation, New York, N. Y., a corporation of New York No Drawing. Application April 27, 1938, Serial No. 204,705

4 Claims. (Cl. 18—48)

The present invention relates to treating casein sheets and casein extruded strips, which have dried more or less on the surface portion but which still contain a normal moisture content in the interior portions. Hereinafter, I will use the term "shapes" to cover sheets and strips, generically.

Casein sheets are ordinarily made by placing masses of plasticized casein (for example short lengths of extruded rods) on the bottom of a plain surface mold, putting a plain surface cover over these masses of casein, hot pressing under high pressure, e. g., a hydraulic press, while being heated to temperatures up to about 190° F., then, while continuing the pressure, cooling the assemblage so formed, and finally removing from the press. In some places the hot pressing is performed in one hydraulic press and the sheet mold carrying the sheet is then removed to a cold press and further pressed and chilled. This latter gives economy in heat, but usually does not produce as good sheets.

Extruded strips are ordinarily prepared by extrusion of plasticized casein mass, under high pressure, from an extrusion press which is jacketed or otherwise heated. The extrusion is through a narrow long perforation in an extrusion die.

The extruded strip, as it is being extruded is hot, so that moisture will evaporate from the surface of this rather rapidly. The sheets, when they are taken out of the mold and allowed to stand around in the atmosphere may also dry out on the surface, to a substantial extent.

Both of these operations accordingly may give shapes, having a more or less dried surface, and in many processes the next operation is usually to stamp out discs or other shapes; in a punch having a reciprocating sharp edged cutter or knife, and it has frequently been noticed that the surfaces adjacent to the edges of the disc or article so punched out is more or less faulty, displaying numerous small cracks or "crowfeet." My investigations have shown that these cracks are largely due to the fact that the surface portion of the casein shape is somewhat dried out, as compared with the interior of the said casein shape. These cracks mostly appear on the upper surface of the cut out portion, adjacent the edge.

I have found that it is readily possible to prevent these unsightly cracks, by restoring the lost moisture to the surface portions of the said shapes without substantially affecting the moisture content of the interior portion of the said shapes.

For accomplishing this purpose, the shapes are put into a room or cabinet, with a rather moist atmosphere, at substantially above ordinary room temperature, say between 70 and 190° F. or even 212° F., and preferably at a temperature between 90 and 130° F.

In stating that the atmosphere in the room or cabinet is wet or moist, I mean that the relative humidity is high, i. e. with the lower temperatures in the range given the relative humidity is at least about 70%, and with the higher temperatures in the range given, the relative humidity is at least 85%. With all these temperatures the humidity may be up to just below the dew point for the temperature employed. It will be understood that the temperature of the room or cabinet will be controlled by suitable means, and the moisture content of the atmosphere therein may be regulated by any suitable means such as by blowing in small steam jets, or by water sprays, or both. It is advisable that the moisture content of the atmosphere be below the dew point, otherwise water may deposit on the surface of the shapes, which of course would be objectionable.

Depending upon the temperature of the atmosphere in said room, the time may vary considerably. Sheets and strips are (for the purposes above indicated) ordinarily between about 2 millimeters and about 6 millimeters in thickness. Irrespective of the thickness of the shapes being treated, if a temperature of 130° F. is maintained in the said room, and the moisture content of the atmosphere is close to the dew point, about a half hour may be a sufficient length of time for this treatment. If the temperature is substantially lower, say 80° F., and the moisture content is close to the dew point for that temperature, at least 3 to 4 hours would be required. It will be understood that these times stated are about the minimum lengths of time that the sheets will remain in the said room or cabinet, and they are preferably left there until just before the above-mentioned punching operation. In most cases it is not advisable to leave the shapes in the said room for a sufficient time for the surface of the same to take up substantially more moisture than was originally present therein. It will be found that the punching will be substantially free from the above-mentioned cracks, and hence will be of an improved quality. There is a distinct advantage in rehumidifying the surface at a high temperature because the said operation is faster.

I claim:

1. A process of treating moist plasticized casein in the form of sheets and strips and which contain substantially normal moisture content in the interior portions but which contain substantially less moisture than this in the surface portion, which comprises subjecting such material to a moist atmosphere at above normal room temperature up to about 212° F., said atmosphere containing moisture in a proportion corresponding to a relative humidity above 85% but below the dew point.

2. A process of treating moist plasticized casein in the form of sheets or strips and of which the surface portion contains a smaller percentage of moisture than the interior portions, which comprises subjecting such material to a moist atmosphere at above normal room temperature up to about 212° F., said atmosphere containing moisture in a proportion corresponding to a relative humidity above 85% but below the dew point and continuing such conditions at least until the surface portions of the said shapes contain as much moisture as does the interior portions thereof.

3. A process of treating moist plasticized casein in the form of sheets and strips and which are dryer on the surface than in the interior, which comprises subjecting such material to a moist atmosphere at above normal room temperature up to about 212° F., said atmosphere containing moisture in a proportion corresponding to a relative humidity above 85% but below the dew point and continuing such conditions at least until the surface portions of the said shapes contain as much moisture as does the interior portions thereof and thereafter, without allowing the surfaces to dry out substantially, punching said shapes by cutting knives, to give surfaces substantially free from cracks.

4. A process of treating moist plasticized casein in the form of partially surface dried sheets and strips, which comprises subjecting such material to a moist atmosphere at above normal room temperature up to about 212° F., said atmosphere containing moisture in a proportion corresponding to a relative humidity above 70% but below the dew point.

JOHN A. PARSONS.